(12) United States Patent
Haltiner, Jr. et al.

(10) Patent No.: US 9,356,307 B2
(45) Date of Patent: *May 31, 2016

(54) MULTIPLE STACK FUEL CELL SYSTEM (75) Inventors: Karl J. Haltiner, Jr., Fairport, NY (US);
Charles J. Badura, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 1159 days.

This patent is subject to a terminal disclaimer.

(21) Appl. No.: 12/788,834

(22) Filed: May 27, 2010

(65) Prior Publication Data

US 2011/0269052 A1    Nov. 3, 2011

(51) Int. Cl.
*H01M 8/12* (2006.01)
*H01M 8/24* (2016.01)
*H01M 8/04* (2016.01)

(52) U.S. Cl.
CPC ............ *H01M 8/249* (2013.01); *H01M 8/2425* (2013.01); *H01M 8/0494* (2013.01); *H01M 8/04679* (2013.01); *H01M 2008/1293* (2013.01); *Y02E 60/50* (2013.01); *Y02E 60/525* (2013.01)

(58) Field of Classification Search
CPC ............................ H01M 8/249; H01M 8/0482
USPC ........................................................ 429/456
See application file for complete search history.

(56) References Cited

U.S. PATENT DOCUMENTS

| 5,480,738 | A | 1/1996 | Elangovan et al. | |
|---|---|---|---|---|
| 6,110,612 | A * | 8/2000 | Walsh | 429/413 |
| 6,692,859 | B2 | 2/2004 | Mukerjee et al. | |
| 7,279,246 | B2 * | 10/2007 | Kelly et al. | 429/425 |
| 7,323,270 | B2 | 1/2008 | Patel et al. | |
| 7,399,547 | B2 | 7/2008 | Perry | |
| 7,534,521 | B2 | 5/2009 | Hu et al. | |
| 2003/0235746 | A1 * | 12/2003 | Haltiner et al. | 429/38 |
| 2005/0106446 | A1 | 5/2005 | Sato et al. | |
| 2007/0196704 | A1 | 8/2007 | Valensa et al. | |
| 2009/0004531 | A1 | 1/2009 | Haltiner, Jr. et al. | |
| 2009/0053569 | A1 | 2/2009 | Perry et al. | |

FOREIGN PATENT DOCUMENTS

| DE | 102004003670 A1 | 7/2005 |
|---|---|---|
| EP | 1677380 A1 | 7/2006 |
| WO | 2010043767 A1 | 4/2010 |

OTHER PUBLICATIONS

EP Search Report Dated Jan. 29, 2014.

* cited by examiner

*Primary Examiner* — Ula C Ruddock
*Assistant Examiner* — Archer Dudley
(74) *Attorney, Agent, or Firm* — Joshua M. Haines (57) ABSTRACT A fuel cell system is disclosed comprising a plurality of fuel cell modules including a sealed planar fuel cell stack, the stack including internal manifold channels for transport of fuel and air to fuel cells within the stack and transport of tail gas and spent air away from fuel cells within the stack. Each of the fuel cell stacks is mounted on a stack footprint area of a top member of a base manifold. The base manifolds are configured to allow for interconnection of a number of fuel cell stack modules to provide a fuel cell system capable of producing power outputs that otherwise would have required large surface area cells or stack with a large number of cells.

18 Claims, 5 Drawing Sheets

MULTIPLE STACK FUEL CELL SYSTEM

RELATIONSHIP TO GOVERNMENT CONTRACTS

This invention was made with Government support under DE-FC26-02NT41246 awarded by DOE. The Government has certain rights in this invention.

BACKGROUND OF THE INVENTION

In practical fuel cell systems, the output of a single fuel cell is typically less than one volt, so connecting multiple cells in series is required to achieve useful operating voltages. Typically, a plurality of fuel cell stages, each stage comprising a single fuel cell unit, are mechanically stacked up in a "stack" and are electrically connected in series electric flow from the anode of one cell to the cathode of an adjacent cell via intermediate stack elements known in the art as interconnects and separator plates.

A solid oxide fuel cell (SOFC) comprises a cathode layer, an electrolyte layer formed of a solid oxide bonded to the cathode layer, and an anode layer bonded to the electrolyte layer on a side opposite from the cathode layer. In use of the cell, air is passed over the surface of the cathode layer, and oxygen from the air migrates through the electrolyte layer and reacts in the anode with hydrogen being passed over the anode surface, forming water and thereby creating an electrical potential between the anode and the cathode of about 1 volt. Typically, each individual fuel cell is mounted, for handling, protection, and assembly into a stack, within a metal frame referred to in the art as a "picture frame", to form a "cell-picture frame assembly".

To facilitate formation of a prior art stack of fuel stages wherein the voltage formed is a function of the number of fuel cells in the stack, connected in series, a known intermediate process for forming an individual fuel cell stage joins together a cell-picture frame assembly with an anode interconnect and a metal separator plate to form an intermediate structure known in the art as a fuel cell cassette ("cassette"). The thin sheet metal separator plate is stamped and formed to provide, when joined to the mating cell frame and anode spacers, a flow space for the anode gas. Typically, the separator plate is formed of ferritic stainless steel for low cost.

As part of the assembly process for the cell-picture frame assembly, each cassette is sealed to the perimeter of the metal separator plate of the adjacent cassette to form a cathode air flow space and to seal the feed and exhaust passages for air and hydrogen against cross-leaking or leaking to the outside of the stack. The picture frames may also include openings therein, which provide internal manifolding after the stack has been assembled for the inter-cell flow of air and fuel to and from the intra-cell anode and cathode flow spaces.

The power output P of a fuel cell stack is the product of the voltage V and current I, $$P = IV \qquad \text{(Eq. 1)}$$

The voltage is a function of the number of fuel cells connected in series in the stack, while the current is a function of the active area of the individual fuel cells. Thus, in designing a fuel cell system, to increase the power output requires an increase in either the number of fuel cells, or the individual fuel cell area, or both.

There are tradeoffs in the number of cells and the surface area of the cells to achieve a desired power level.

Adding more cells in series to increase stack voltage is relatively straightforward, but the reliability of each cell-to-cell connection becomes more critical since the overall reliability of a stack of N cells is a function of the reliability of each connection raised to the Nth power. Also, the resistive losses at the cell-to-cell junctures increase with each connection, and the proportion of system volume required for manifolding of the inlet and return gases increases. Also, in enclosed design stacks where the periphery of the stack is sealed, individual cells in the stack cannot be removed or replaced if they fail, which can result in the failure of an entire stack due to the failure of a single cell. This problem is exacerbated when the stack contains a large number of cells due to the above-described overall drop in stack reliability stacks with large numbers of cells.

On the other hand, increasing the cell active area to increase the stack amperage by increasing the areal extent of each cell presents many challenges. The cell is a planar ceramic structure, so as the size increases the thickness must also increase to preserve the same level of mechanical strength (that is, resistance to breakage) which significantly increases the cost and size (volume) of the cell per unit area of electric generating capacity. In addition, the manufacturing defect rate is determined by the number of defects per cell, not per unit area, so as the area of a cell increases the number of defects per cell will increase, which adversely affects the overall manufacturing rejection rate in both cell manufacturing and stack manufacturing. Also, as the surface area increases at a constant length-to-width ratio (currently preferred aspect ratio of a prior art fuel cell is about 3:2), the thermal differences across the cell will increase, or the pressure drop will increase, or the gas channel height (and thus overall stack height) will increase, or some intermediate combination of all of these effects must occur. Alternatively, the width or length may be increased while maintaining the same length or width, but this departure from a prior art near-square cell shape makes firing of the ceramic cell very difficult while maintaining acceptable flatness and uniform shrinkage.

One approach to increasing power output without unduly increasing either the number cells in a stack or the surface area of the cells in the stack has been to link multiple stacks of manageable size together in a multi-stack fuel cell system. Many approaches to such system designs involve the incorporation of so-called open-cell design fuel cell stacks into a relatively large enclosure that directs fuel and air into stacks housed within the enclosure and receives tail gas and spent air from those stacks for optional further processing and ultimate discharge to the outside. Such systems are disclosed, for example, in U.S. Pat. Nos. 5,480,738 and 5,298,341, and U.S. Pat. Appl. Publ. No. 2009/0053569 A1. Such systems, however, suffer from a number of disadvantages. For example, because open-cell design stacks are open to whatever gas they are exposed to, the enclosure must often provide multiple sealed connections to the stacks so that air can be selectively directed to and spent air selectively received from cathode openings on the stack, and so that fuel can be selectively directed to and tail gas selectively received from anode openings on the stacks. Such seals must be maintained across multiple fuel cells in the stacks, which makes it difficult to account for thermal expansion while maintaining a gas-tight seal. Additionally, since the cells in a stack are connected in electrical series, they are at different voltages, so the seal must be electrically insulating, which can make it even more difficult to establish and maintain a gas-tight seal through multiple thermal cycles. Some design approaches may somewhat simplify the requirement for sealing surfaces across multiple cells by using alternative flow patterns within the stack. For example, the above-cited U.S. Pat. No. 5,480,738 and U.S. Pat. No. 5,298,341 each provides different approaches for vertical fuel flow upwards through the stack while having horizontal air flow across the cell cathode surfaces. This design, however, results in a cross-flow arrangement of fuel and air flows across the fuel cells, which causes high thermal gradients and therefore high stress on the cells. In addition, a vertical cell orientation is less resistant to external forces such as gravity and common vibrational input, which may be better absorbed by the cell and supporting structures in a horizontal arrangement. Also, external manifolding arrangements are difficult to seal due to irregular surfaces on the sides of the stacks inherent in their layered construction.

The above-described disadvantages with open-cell stack designs can be avoided by an enclosed cell stack design with internal manifold channels for fuel and air flow as described, for example, in U.S. Pat. No. 7,306,872, the disclosure of which is incorporated herein by reference in its entirety. Heretofore, however, there has not been a way to effectively connect multiple enclosed cell design stacks without the use of complex external manifolds or piping.

What is needed in the art is a means to increase the power output of a fuel cell system while mitigating the above-identified problems.

SUMMARY OF THE INVENTION

The present invention provides a multi-stack fuel cell system where multiple fuel cell stacks can be efficiently connected together. According to the present invention, there is provided a fuel cell system comprising a plurality of fuel cell modules that comprise a sealed planar fuel cell stack, the stack including internal manifold channels for transport of fuel and air to fuel cells within the stack and transport of tail gas and spent air away from fuel cells within the stack. Each of the fuel cell stacks is mounted on a stack footprint area of a top member of a base manifold.

The base manifold includes
(1) at least two air openings outside of the stack footprint area that are in fluid communication with each other and with at least one opening inside of the stack footprint area that is in fluid communication with the stack internal channels for delivering air to the fuel cells within the stack;
(2) at least two spent air openings outside of the stack footprint area that are in fluid communication with each other and with at least one opening inside of the stack footprint area that is in fluid communication with the stack internal channels for receiving spent air from the fuel cells within the stack;
(3) at least two fuel openings outside of the stack footprint area that are in fluid communication with each other and with at least one opening inside of the stack footprint that is in fluid communication with the stack internal channels for delivering fuel to the fuel cells within the stack;
(4) at least two tail gas openings outside of the stack footprint area that are in fluid communication with each other and with at least one opening inside of the stack footprint area that is in fluid communication with the stack internal channels for receiving tail gas from the fuel cells within the stack;

The above-described modules of fuel cell stacks mounted on top of base manifolds are tied together in a system by the provision of at least two fuel cell modules that are juxtaposed with one another such that an air opening, spent air opening, fuel opening, and tail gas opening on the base manifold of one of the juxtaposed fuel cell modules is respectively juxtaposed with and connected in fluid communication with an air opening, spent air opening, fuel opening, and tail gas opening on the base manifold of the adjacent juxtaposed fuel cell module. Also, at least one of the air openings is in fluid communication with an air source, at least one of the spent air openings is in fluid communication with the atmosphere or an air exhaust, at least one of the fuel openings is in fluid communication with a fuel source, and at least one of the tail gas openings is in fluid communication with the atmosphere or a tail gas exhaust.

The system allows for a number of fuel cell stack modules to be connected together to provide a fuel cell system capable of producing power outputs that otherwise would have required large surface area cells or a stack with a large numbers of cells. Multiple modestly-sized stacks (e.g., 5-25 kW) can be used so that higher power levels can be achieved using stacks that have been produced for other markets like the APU market, providing potentially significant economies of scale by avoiding the need to design different stacks for higher power applications. Also, any number of fuel cell stack modules can be easily connected together, so the system is highly flexible. The modular nature of the system also allows for individual stacks to be removed and replaced or isolated if they develop any problems. These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments, without limiting same. Where practical, reference numbers for like components are commonly used among multiple figures.

Figure 1:
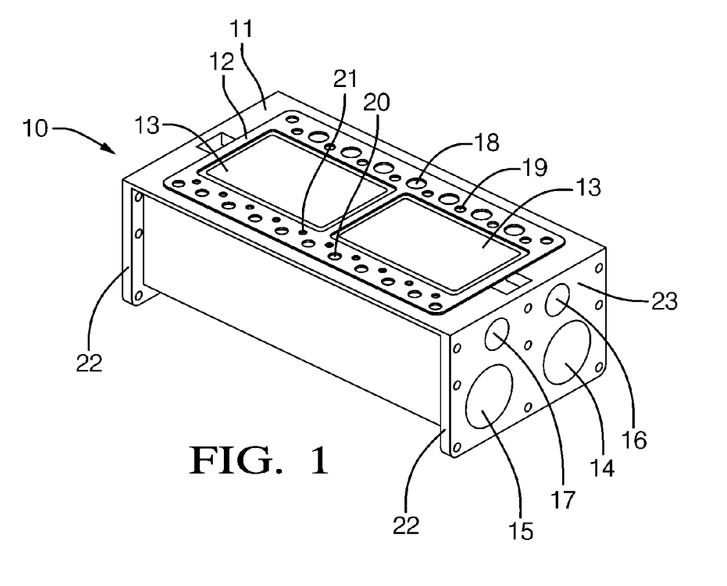
FIG. 1 shows a perspective view of a base manifold that can be used to practice the invention.
Figure 2:
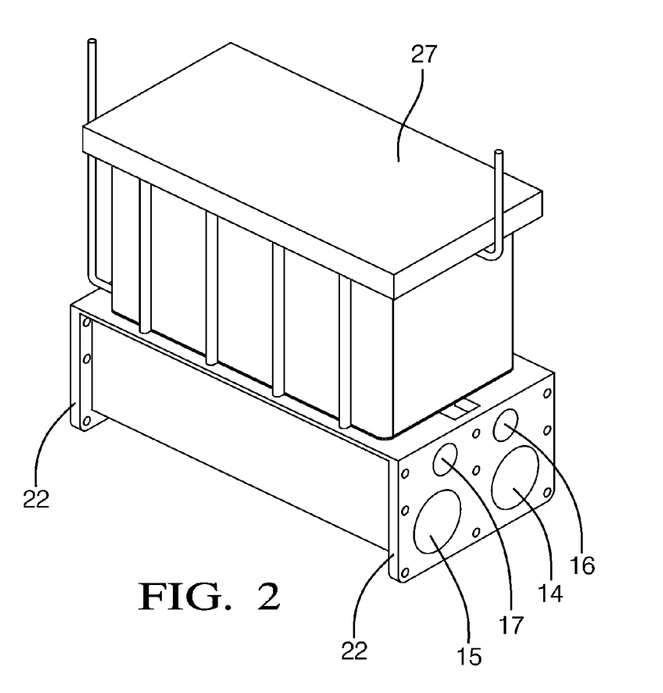
FIG. 2 shows a perspective view of the base manifold of FIG. 1 with a fuel cell stack mounted thereon to form a fuel cell module that can be used to practice the invention.

Turning now to FIGS. 1 and 2, an exemplary embodiment of a base manifold that can be used to practice the invention is shown in perspective view. In FIG. 1, base manifold 10 is shown with top member 11 having fuel cell frame footprint 12, which surrounds fuel cell footprint 13. Fuel cell frame footprint 12 and fuel cell footprint 13 together make up the fuel cell stack footprint, on top of which a fuel cell stack (e.g., a solid oxide fuel cell stack) will be mounted. The fuel cell footprint 12 is shown with a two-cell configuration, such as disclosed in US Pat. Appl. Pub. No. 2009/0004531 A1, the disclosure of which is incorporated herein by reference in its entirety, however other configurations could be used as well, such single cell, quadruple cell, or any other configuration. Each of the openings 14, 15, 16, and 17 on base manifold side member 23 is in fluid communication through channels in the base manifold 10 with openings 14, 15, 16, and 17 symmetrically disposed on the side member (not shown) on the opposite side of the manifold from side member 23. Air openings 14 receive air feed from an air source such as an air pump (not shown), and are in fluid communication through internal channels (not shown) with top member openings 18, which feed air to internal channels in the fuel cell stack for distribution to the fuel cells. Fuel openings 16 receive fuel feed from a fuel source such as a reformer or natural gas feed (not shown), and are in fluid communication through internal channels (not shown) with top member openings 19, which feed fuel to internal channels in the fuel cell stack for distribution to the fuel cells. Spent air openings 15 receive spent air through internal channels (not shown) from top member openings 20, which in turn receive spent air from the fuel cells through internal channels in the fuel cell stack. Spent air openings 15 discharge the spent air to the atmosphere or a separate air exhaust handler (not shown). Tail gas openings 17 receive tail gas through internal channels (not shown) from top member openings 21, which in turn receive tail gas from the fuel cells through internal channels in the fuel cell stack. Tail gas openings 17 discharge the tail gas to the atmosphere or a separate tail gas exhaust handler such as a tail gas burner (not shown). Manifold side member 23 and the side member on the opposite side of the manifold (not shown) have flange extensions 22 thereon for connecting to base manifolds of adjacent juxtaposed fuel cell modules or to an external manifold, for example to connect the respective air or fuel source or exhaust handlers.

Turning now to FIG. 2, a fuel cell stack 27 is shown mounted on the base manifold top member 11 over the fuel cell stack footprint 12, 13. The fuel cell stack has internal channels (not shown) for delivering air received from manifold openings 18 and fuel received from manifold openings 19 to the cells in the stack, and for delivering spent air from fuel cells in the stack to manifold openings 20 and tail gas to manifold openings 21. The fuel cell stack is mounted on the base manifold such that the stack's internal channels are in fluid communication with the above-referenced openings on the manifold top member.

Figure 3:
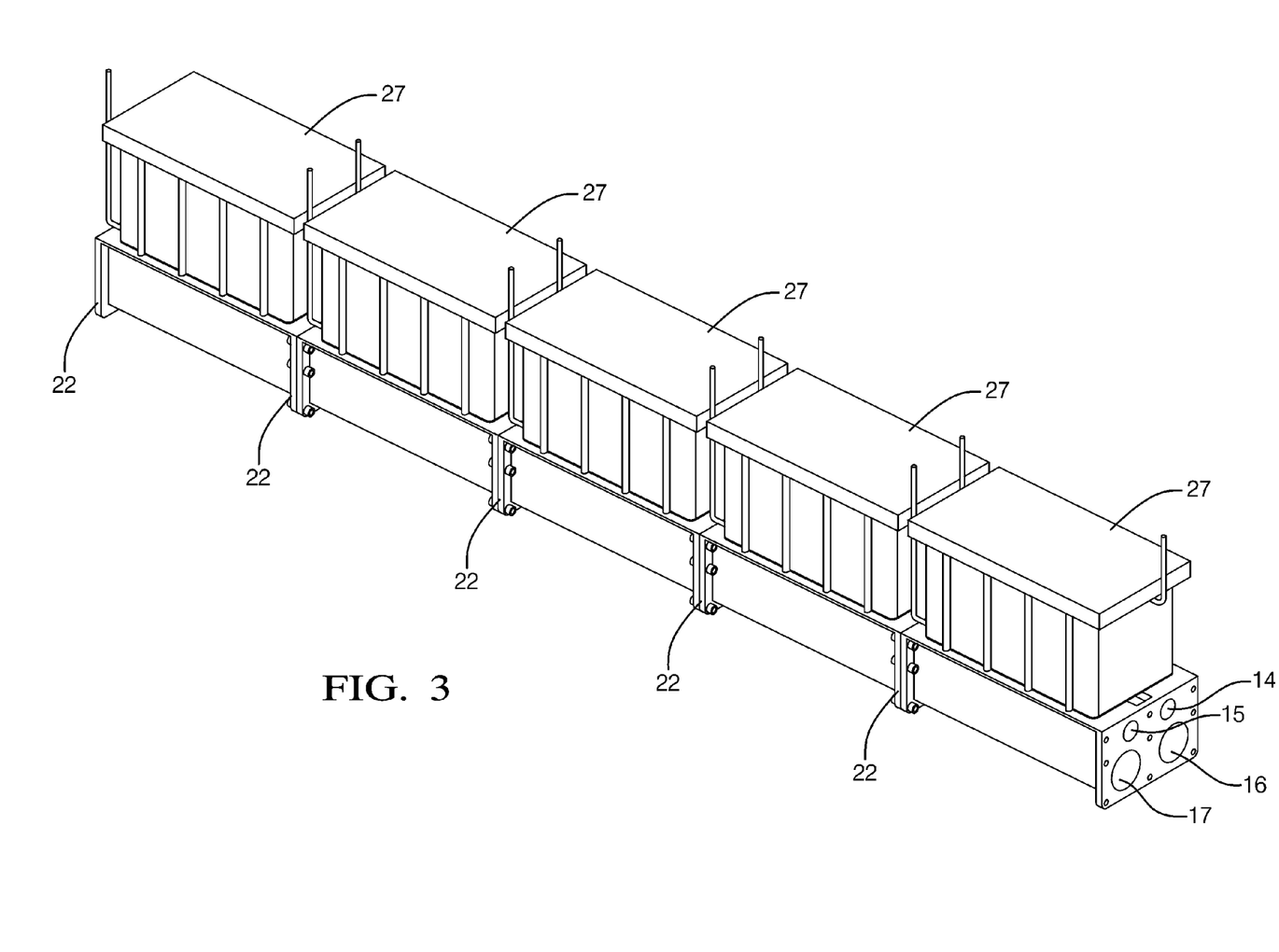
FIG. 3 shows a perspective view of a fuel cell system of five of the fuel cell modules of FIG. 2 arranged in a horizontal linear configuration.

Turning now to FIG. 3, a fuel cell system is shown with five of the modules from FIG. 2 connected together end to end in a linear configuration. If each of the fuel cell stacks had a 5 kW power capacity and were electrically connected in parallel, this system would provide 25 kW of power. Each module is shown connected to adjacent module(s) with a suitable connector (e.g., nut and bolt) at the flanges 22. In an exemplary embodiment as shown in FIG. 3, the adjacent modules are directly connected to one another (a "direct" connection is defined herein for this purpose to include embodiments where a sealant or gasket is disposed between the adjacent flanges 22). In other exemplary embodiments, however, it is contemplated that indirect connections may be utilized where an inter-module connector is used, such as a metal body with connecting passages therein and flanges on each end for mating with the module flanges 22. The openings on the right-most module are shown as open for purposes of illustration, but in operation would of course be connected to external components, such as an air source (e.g., a pump) for air opening 14, a fuel source (e.g., a hydrocarbon reformer) for fuel opening 16, an air exhaust handler (e.g., an exhaust pipe) for spent air opening 15, and a tail gas exhaust handler (e.g., a burner) for tail gas opening 17. The openings (not shown in FIG. 3) on the left-most module may be connected to similar or the same external components, or they may be sealed with a blank flange mounted on the left-most flange 22, depending on the gas flow requirements of the system. Alternatively, since only one out of the two available end openings for each of the four types of openings (air, spent air, fuel, and tail gas) needs to be functional, any combination of these openings may be selected to be functional. For example, the right-most end module may have two fuel openings (fuel opening 16 and tail gas opening 17) functional and connected to external components, with the air opening 14 and spent air opening 15 blocked off, in which case the left-most end module would have two air openings (air opening 14 and spent air opening 15) functional and connected to external components, with the fuel opening 16 and tail gas opening 17 blocked off.

Figure 4:
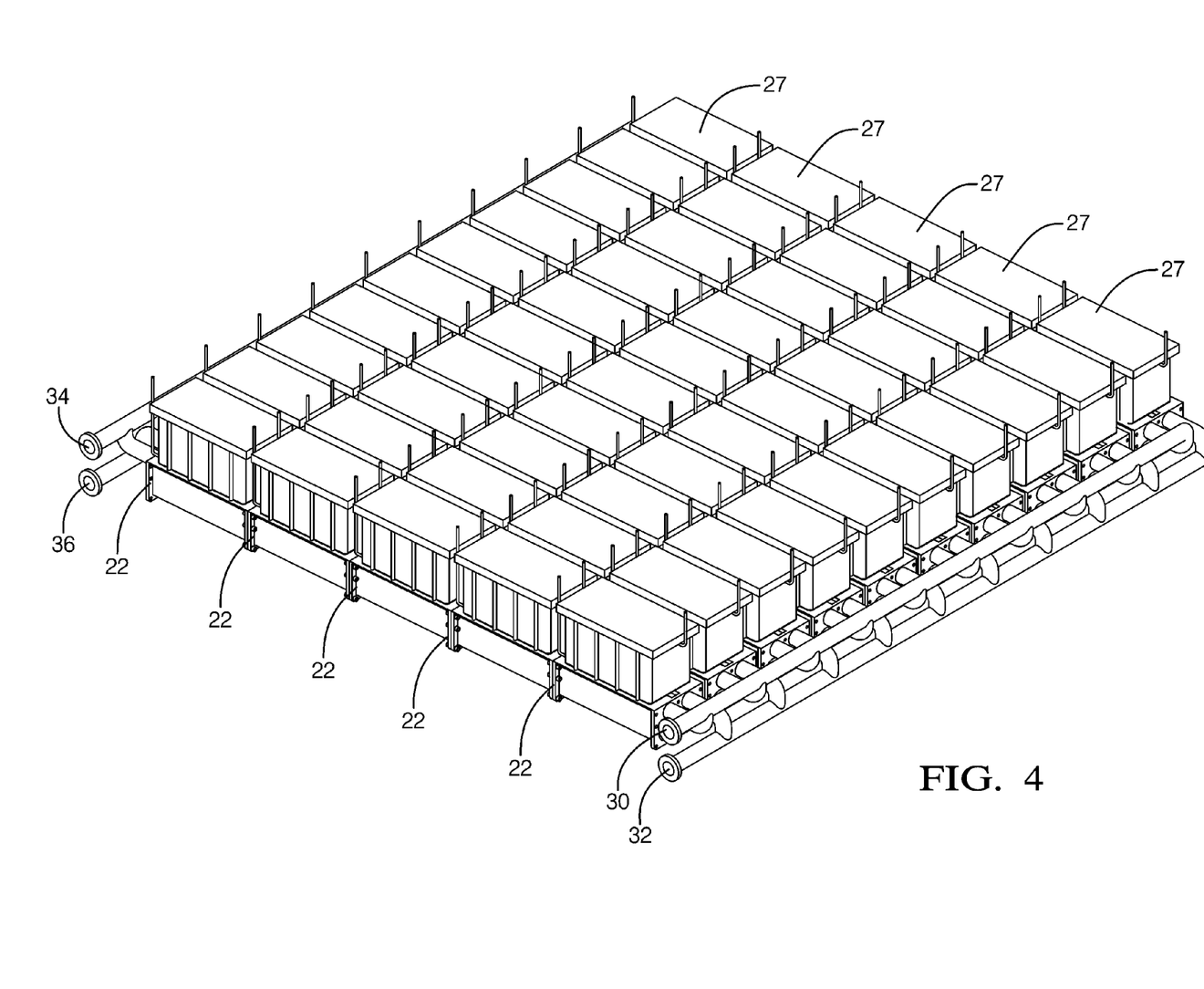
FIG. 4 shows a perspective view of ten of the linear configurations of FIG. 3 linked together in fluid communication with external manifolding.

Turning now to FIG. 4, there is shown a system having ten of the 5-module configurations from FIG. 3 arranged side by side with the air, spent air, fuel, and tail gas openings connected in fluid communication by external manifolds. External manifold 30 connects the tail gas openings 17 on the right end modules together in fluid communication and external manifold 32 connects the fuel openings 16 on the right end modules together in fluid communication, while the air openings 14 and spent air openings 15 on the right end modules are closed off. External manifold 36 connects the air openings 14 on the left end modules together in fluid communication and external manifold 34 connects the spent air openings 15 on the left end modules together in fluid communication, while the fuel openings 16 and tail gas openings 17 on the left end modules are closed off.

Figure 5:
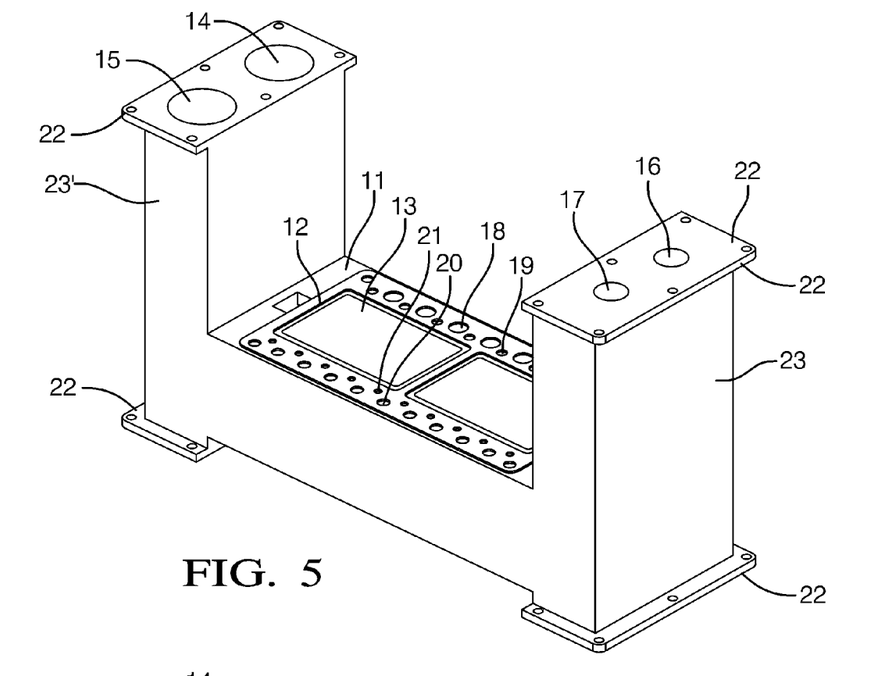
FIG. 5 shows a perspective view of an alternative configuration of a base manifold that can be used to practice the invention.
Figure 6:
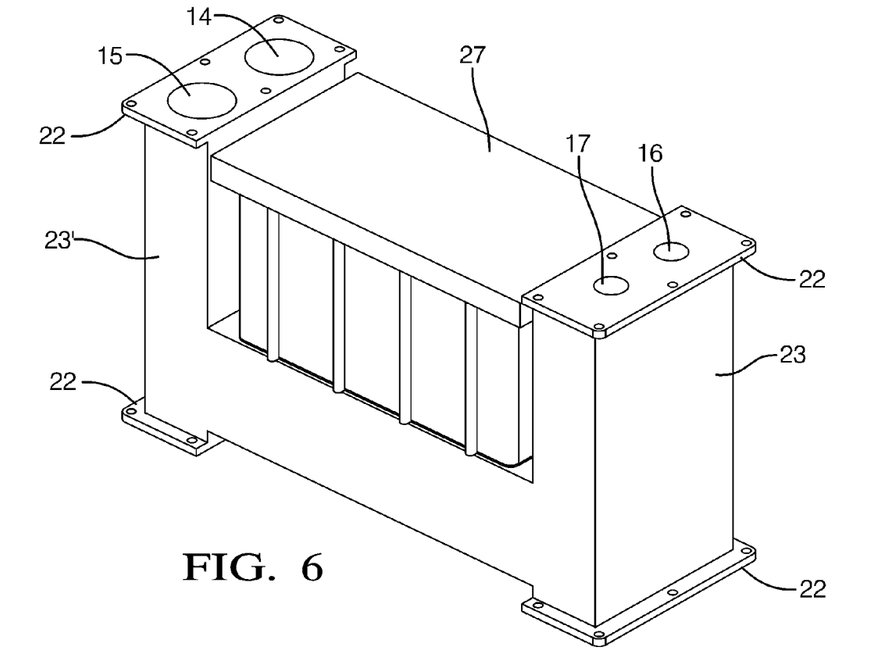
FIG. 6 shows a perspective view of the base manifold of FIG. 5 with a fuel cell stack mounted thereon to form a fuel cell module that can be used to practice the invention.
Figure 7:
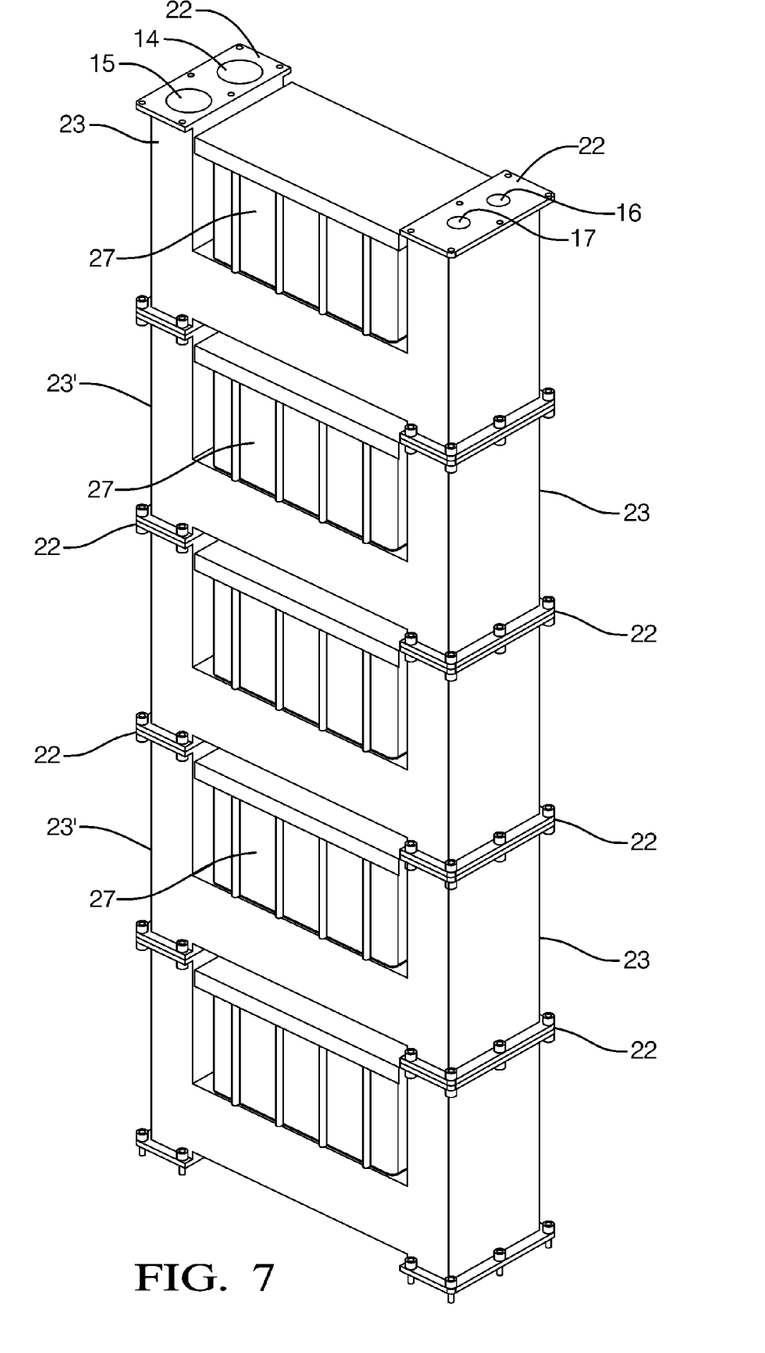
FIG. 7 shows a perspective view of a fuel cell system of five of the fuel cell modules of FIG. 6 arranged in a vertical configuration.

Turning now to FIGS. 5-7, FIG. 5 shows an alternative embodiment of a base manifold that can be used to practice the invention is shown in perspective view. In FIG. 5, base manifold 10 is shown with top member 11 having fuel cell frame footprint 12, which surrounds fuel cell footprint 13. The fuel cell footprint 12 is shown with a two-cell configuration, such as disclosed in US Pat. Appl. Pub. No. 2009/ 0004531 A1, the disclosure of which is incorporated herein by reference in its entirety, however other configurations could be used as well, such single cell, quadruple cell, or any other configuration. Fuel cell frame footprint 12 and fuel cell footprint 13 together make up the fuel cell stack footprint, on top of which a fuel cell stack (e.g., a solid oxide fuel cell stack) will be mounted. Each of the openings 14, 15, 16, and 17 on the upper surface of base manifold side members 23 and 23' are in fluid communication through channels in the base manifold side members 23 and 23' with openings 14, 15, 16, and 17 symmetrically disposed on the lower surface of side members 23 and 23'. Air openings 14 receive air feed from an air source such as an air pump (not shown), and are in fluid communication through internal channels (not shown) with top member openings 18, which feed air to internal channels in the fuel cell stack for distribution to the fuel cells. Fuel openings 16 receive fuel feed from a fuel source such as a reformer or natural gas feed (not shown), and are in fluid communication through internal channels (not shown) with top member openings 19, which feed fuel to internal channels in the fuel cell stack for distribution to the fuel cells. Spent air openings 15 receive spent air through internal channels (not shown) from top member openings 20, which in turn receive spent air from the fuel cells through internal channels in the fuel cell stack. Spent air openings 15 discharge the spent air to the atmosphere or a separate air exhaust handler (not shown).

Tail gas openings 17 receive spent air through internal channels (not shown) from top member openings 21, which in turn receive tail gas from the fuel cells through internal channels in the fuel cell stack. Tail gas openings 17 discharge the tail gas to the atmosphere or a separate tail gas exhaust handler such as a tail gas burner (not shown). The upper and lower surfaces of manifold side members 23 and 23' have flange extensions 22 thereon for connecting to base manifolds of adjacent juxtaposed fuel cell modules or to an external manifold, for example to connect the respective air or fuel source or exhaust handlers.

Turning now to FIG. 6, a fuel cell stack 27 is shown mounted on the base manifold top member 11 over the fuel cell stack footprint 12, 13. The fuel cell stack has internal channels (not shown) for delivering air received from manifold openings 18 and fuel received from manifold openings 19 to the cells in the stack, and for delivering spent air from fuel cells in the stack to manifold openings 20 and tail gas to manifold openings 21. The fuel cell stack is mounted on the base manifold such that the stack's internal channels are in fluid communication with the above-referenced openings on the manifold top member.

Turning now to FIG. 7, an exemplary embodiment of a fuel cell system is shown with five of the modules from FIG. 6 connected together end to end in a linear configuration. If each of the fuel cell stacks had a 5 kW power capacity and were electrically connected in parallel, this system would provide 25 kW of power. In an exemplary embodiment as shown in FIG. 7, each module is connected to adjacent module(s) with a suitable connector (e.g., nut and bolt) at the flanges 22. In an exemplary embodiment as shown in FIG. 7, the adjacent modules are directly connected to one another (a "direct" connection is defined herein for this purpose to include embodiments where a sealant or gasket is disposed between the adjacent flanges 22). In other exemplary embodiments, however, it is contemplated that indirect connections may be utilized where an inter-module connector is used, such as a metal tube with flanges on each end for mating with the module flanges 22. The openings on the upper-most module are shown as open for purposes of illustration, but in operation would of course be connected to external components, such as an air source (e.g., a pump) for air opening 14, a fuel source (e.g., a hydrocarbon reformer) for fuel opening 16, an air exhaust handler (e.g., an exhaust pipe) for spent air opening 15, and a tail gas exhaust handler (e.g., a burner) for tail gas opening 17. The openings (not shown in FIG. 7) on the lower-most module may be connected to similar or the same external components, or they may be sealed with a blank flange mounted on the lower-most flange 22, depending on the gas flow requirements of the system. Alternatively, since only one out of the two available end openings for each of the four types of openings (air, spent air, fuel, and tail gas) needs to be functional, any combination of these openings may be selected to be functional. For example, the upper-most end module may have two fuel openings (fuel opening 16 and tail gas opening 17) functional and connected to external components, with the air opening 14 and spent air opening 15 blocked off, in which case the lower-most end module would have two air openings (air opening 14 and spent air opening 15) functional and connected to external components, with the fuel opening 16 and tail gas opening 17 blocked off.

The modular fuel cell system disclosed herein can provide for economies of scale by using small stacks mass-produced for the APU market to be used in place of large power output stack by mounting the stacks onto a modular base manifold. The power leads for each stack would pass out of the often hostile stack environment into an external environment where they can be connected in combinations of series and/or parallel as desired using conventional electrical connection technologies. Additionally, each stack can be independently connected to power electronic controls so that the performance of each stack can be individually optimized, and one stack operating below performance standards would have little effect on the complete system, and could even be switched off if required, and then later replaced with a new stack if desired.

The system disclosed herein can be used with any type of fuel cell stack, including SOFC, PEM, molten carbonate, and phosphoric acid. In one exemplary embodiment, the fuel cell stack is a solid oxide fuel cell (SOFC) stack. In another exemplary embodiment, the SOFC stack is made up of a plurality of repeating fuel cell cassettes that comprise a frame disposed around at least one fuel cell, such as disclosed in the above-referenced U.S. Pat. No. 7,306,872.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A fuel cell system comprising a plurality of fuel cell modules that comprise a sealed planar fuel cell stack, the stack including internal channels for delivery of fuel and air to fuel cells within the stack and removal of tail gas and spent air away from fuel cells within the stack, each of said fuel cell stacks mounted on a stack footprint area of a top member of a base manifold, wherein (a) the base manifold includes:

(1) at least two air openings outside of the stack footprint area that are in fluid communication with each other and with at least one opening inside of the stack footprint area that is in fluid communication with the stack internal channels for delivering air to the fuel cells within the stack;

(2) at least two spent air openings outside of the stack footprint area that are in fluid communication with each other and with at least one opening inside of the stack footprint area that is in fluid communication with the stack internal channels for receiving spent air from the fuel cells within the stack;

(3) at least two fuel openings outside of the stack footprint area that are in fluid communication with each other and with at least one opening inside of the stack footprint that is in fluid communication with the stack internal channels for delivering fuel to the fuel cells within the stack;

(4) at least two tail gas openings outside of the stack footprint area that are in fluid communication with each other and with at least one opening inside of the stack footprint area that is in fluid communication with the stack internal channels for receiving tail gas from the fuel cells within the stack;

(b) the system includes at least two fuel cell modules that are juxtaposed with one another such that at least one air opening, spent air opening, fuel opening, and tail gas opening outside of the stack footprint area on the base manifold of one of said juxtaposed fuel cell modules is respectively juxtaposed with and connected in fluid communication with said at least one air opening, spent air opening, fuel opening, and tail gas opening outside of the stack footprint area on the base manifold of an adjacent juxtaposed fuel cell module; and (c) at least one of said air openings is in fluid communication with an air source, at least one of said spent air openings is in fluid communication with the atmosphere or an air exhaust, at least one of said side fuel openings is in fluid communication with a fuel source, and at least one of said side tail gas openings is in fluid communication with the atmosphere or a tail gas exhaust.

2. A fuel cell system according to claim 1 wherein the base manifold comprises a bottom member, four side members, and said top member, wherein said air openings, spent air openings, fuel openings, and tail gas openings outside of the stack footprint area are symmetrically disposed on opposing side members of the base manifold.

3. A fuel cell system according to claim 2 comprising a row of at least three of said fuel cell modules arranged in a linear configuration with a first end fuel cell module on one end of the linear configuration, a second end fuel module on the opposite end of the linear configuration from the first end fuel cell module, and one or more fuel cell modules arranged along the linear configuration between the first and second end fuel cell modules.

4. A fuel cell system according to claim 2 comprising a plurality of rows of fuel cell modules, said rows arranged side-by-side such that the fuel cell system is configured as a two-dimensional array comprising at least four fuel cell modules.

5. A fuel cell system according to claim 4 comprising a plurality of said two-dimensional arrays stacked together to form a three-dimensional array comprising at least eight fuel cell modules.

6. A fuel cell system according to claim 4, further comprising at least one external manifold means for:

(1) connecting a plurality air openings along one end of said two-dimensional array in fluid communication with an air source,
(2) connecting a plurality of spent air openings along one end of said two-dimensional array in fluid communication with the atmosphere or an air exhaust,
(3) connecting a plurality of fuel openings along one end of said two-dimensional array in fluid communication with a fuel source,
(4) connecting a plurality of tail gas opening along one end of said two-dimensional array in fluid communication with the atmosphere or a tail gas exhaust, or
(5) combinations of (1)-(4).

7. A fuel cell system according to claim 5, further comprising at least one external manifold means for:

(1) connecting a plurality air openings along one end of said three-dimensional array in fluid communication with an air source,
(2) connecting a plurality of spent air openings along one end of said three-dimensional array in fluid communication with the atmosphere or an air exhaust,
(3) connecting a plurality of fuel openings along one end of said three-dimensional array in fluid communication with a fuel source,
(4) connecting a plurality of tail gas opening along one end of said three-dimensional array in fluid communication with the atmosphere or a tail gas exhaust, or
(5) combinations of (1)-(4).

8. A fuel cell system according to claim 1 wherein the juxtaposed base manifolds are directly connected to one another.

9. A fuel cell system according to claim 2 wherein the side members of the juxtaposed base manifolds are directly connected to one another.

10. A fuel cell system according to claim 1 wherein the fuel cell stacks comprise solid oxide fuel cells.

11. A fuel cell system according to claim 10 wherein the power capacity of the fuel cell stacks is from 5 kW to 25 kW per module.

12. A fuel cell system according to claim 10 wherein the fuel cell stacks comprise a plurality of repeating fuel cell cassettes that comprise a frame disposed around at least one fuel cell.

13. A fuel cell system according to claim 1 wherein the base manifold includes one or more vertically-disposed members outside the stack footprint area extending at least the combined height of base manifold and fuel cell stack, wherein said air openings, spent air openings, fuel openings, and tail gas openings outside of the stack footprint area are symmetrically disposed on opposing upper and lower surfaces of said one or more vertically-disposed members.

14. A fuel cell system according to claim 1 wherein a plurality of fuel cell modules are each independently connected to one or more external electronic controllers.

15. A fuel cell system according to claim 14 wherein the one or more electronic controllers are configured to disable the fuel cell modules that are non-functional or exhibit substandard performance.

16. A fuel cell system according to claim 14 wherein the one or more electronic controllers are configured to balance the electrical load between fuel cell modules or optimizing performance of the fuel cell system.

17. A fuel cell system according to claim 1 wherein a plurality of fuel cell modules are electrically connected in series, in parallel, or in a combination of series and parallel.

18. A fuel cell system according to claim 17 wherein said electrical connections are formed with electrical leads that pass outside of an insulating enclosure that houses the fuel cell modules.

* * * * *